July 16, 1957     J. WINSON     2,799,519
T-JOINTS FOR SEPARABLE TUBULAR MEMBERS
Filed May 10, 1954
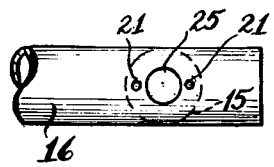
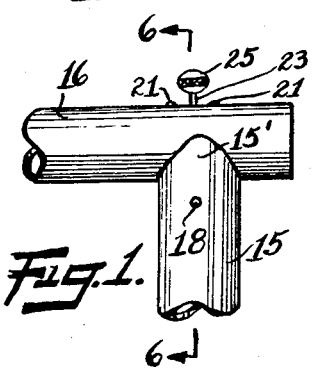
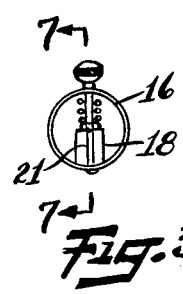
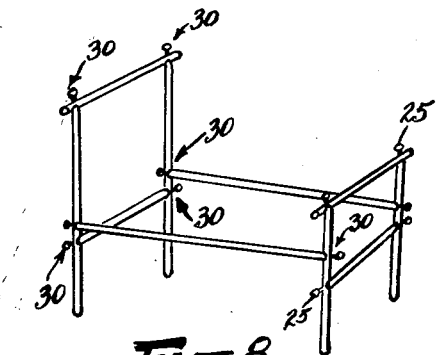
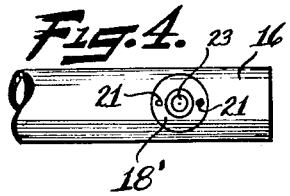
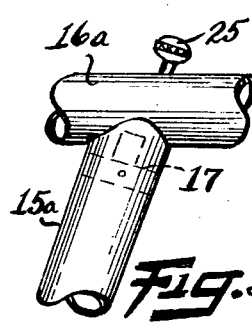
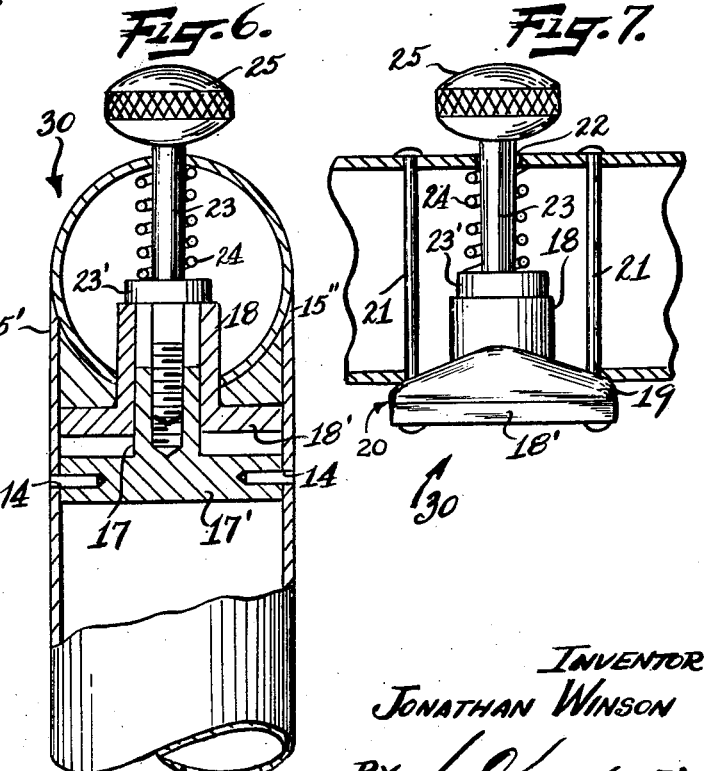
INVENTOR
JONATHAN WINSON
BY
ATTORNEY

United States Patent Office 2,799,519
Patented July 16, 1957

2,799,519

T-JOINTS FOR SEPARABLE TUBULAR MEMBERS

Jonathan Winson, New York, N. Y.

Application May 10, 1954, Serial No. 428,431

2 Claims. (Cl. 285—156)

The present invention relates to a novel and improved T-joint construction particularly adapted for joining tubular members in T-format.

The principal object of this invention is to provide a novel and improved construction for releasably joining a pair of tubular members in the form of a T.

The joint taught herein is especially useful in the construction of collapsible tubular frames of furniture and is adapted for use in collapsible fences, scaffolding, ladders and various other articles, particularly of round tubing.

A further object hereof is to provide a novel and improved joint structure of the character mentioned, which permits easy assembly of the tubing members to be joined, affords a secure joint and permits easy disassembly of said members.

Another object hereof is to provide a novel and improved joint structure of the type described, which affords decoration to collapsible furniture framework.

A further object of this invention is to provide a novel and improved T-joint structure for tubular members which is reasonably cheap to manufacture and efficient in carrying out the functions for which it is designed.

Other objects and advantages will become apparent as this disclosure proceeds.

In the accompanying drawings forming part of this specification, similar characters of reference indicate corresponding parts in all the views.

Fig. 1 is a front view of a pair of tubular members in perpendicular relation, rigidly associated relation, rigidly associated in T-format by use of structure embodying the teachings of this invention.

Fig. 2 is a top plan view thereof.

Fig. 3 is a side view thereof.

Fig. 4 is a bottom view of the tubular member which is horizontal in Fig. 1.

Fig. 5 is a top plan view of the tubular member which is vertical in Fig. 1.

Fig. 6 is an enlarged section taken at lines 6—6 in Fig. 1.

Fig. 7 is an enlarged section taken at lines 7—7 in Fig. 3.

Fig. 8 is a perspective view of a bed frame made of tubular members joined as taught herein.

Fig. 9 is like Fig. 1, except that the tubular members are in non-perpendicular relation.

In the drawings, for an embodiment of this invention, I show a T-joint of the round tubular members 15 and 16, which are in perpendicular relation. Here an end of tube 15, abuts an intermediate portion of the tube 16. Such end of tube 15 is bifurcated to provide a form-fitting seat for the peripheral surface of the tube 16. This association is well known in the sheet metal art and in the subject of intersections in mechanical drawing layouts. What may be called the tines of said bifurcation, are indicated by the numerals 15', 15". Such bifurcation could also be provided when the tubular members are of polygonal cross section except the square, in which instance the top end of the stem tube of the T-format would lie in a plane as could be well understood without further illustration.

Within tube 15, at the end to be joined, there is securely mounted a flanged threaded nut element 17, whose flange 17' fits within said tube 15 and is secured by the pins 14; said nut being concentric with said tube and is preferably round. Through the wall of tube 16 having a suitable hole therefor, there extends a nipple 18 which has a flange 18' at its outer end. Such flange 18' fits slidingly into the tube 15 while the nut 17 fits slidingly into the nipple 18. The space between the flange 18' and the tube 16 is occupied by a washer 19 of suitable contour which may also slide into the tube 15. Though not shown, it is easily understood that when the diameter of said washer 19 is the diameter of the tube 16, the end of said tube may be straight and said washer serve as a seat therefor, in which instance only the flange 18' fits into said tube 16. This would avoid the bifurcation mentioned.

It is practical to have nipple 18, its flange 18' and said washer 19 all of one piece which may be a casting. In the embodiment illustrated, said washer and flange constitute a boss denoted as 20, which is secured by the rivets 21 extendiing crosswise through the tube 16. Said boss may be deemed a ring on the exterior of the tube 16 around a hole through the tube 16. Nipple 18 may also be deemed a ring interior said tube.

In line with the axis position of the tube 15, the tube 16 is provided with a suitable hole for the nipple 18 to be set through and a hole 22 for the shank of a bolt 23 to slidably extend through; such holes being opposite each other. Also opposite pairs of holes are provided for the rivets 21. Said bolt is for engagement in the nut 17, has a lateral protuberance as for instance the flange 23' which is positioned thereon to rest on the nut when in engagement therewith and carries a compression coil spring 24 acting between said flange 23' and the wall region around the hole 22 in the tube 16. The diameter of said flange being smaller than the hole for the nipple 18, assembly is possible. The outer end of the bolt carries a knob 25 which may be secured in any manner.

It is evident that when you turn the knob 25 in Fig. 6 so that the bolt 23 becomes disengaged from the nut 17, the tubular members 15, 16 are separated. To join said tubular members, tube 15 is slid on the boss 20, whereupon nut 17 will slide into the nipple 18. The bolt or screw 23 will have its tip resting in the entrance to the threaded hole of the nut and will stay there because of action of the spring 24 which is stressed. The said bolt is then turned by hand on the knob to engage the nut 17, whereby tube 15 will be drawn against tube 16 because of the flange 23' pressing against the end of the nipple 18. All fitting parts being snug-fitted, the tubular members will be joined to form a sturdy unitary structure.

For the joining of the tubes 15a and 16a in oblique relation as shown in Fig. 9, the end of tube 15a is suitably cut to provide proper seating of the tube 16a thereon and the axis of the bolt and nipple carried by the tube 16a is in alignment with the axis of the tube 15a, as the preferred way of doing same.

The joint structure indicated generally by the numeral 30 is shown applied for joining the separate tubular members forming the bed frame illustrated in Fig. 8. For decorative appearance, as matter of example, the tubular members of this bed frame may be of stock aluminum and the knobs 25 of black plastic.

It is to be noted that similar members in a frame work can be interchanged and sets of tubular members equipped as here taught, may be used to make different frameworks.

This invention is capable of numerous forms and various applications without departing from the essential features herein disclosed. It is therefore intended and desired that the embodiment shown herein be deemed illustrative and not restrictive and that the patent shall cover all patentable novelty herein set forth; reference being had to the following claims rather than to the specific description herein to indicate the scope of this invention.

I claim:

1. In a T-joint construction for a pair of tubes affording their separation when desired, a first tube having a hole through its wall, a nipple extending through said hole part way across the interior of said tube; said nipple having an outward flange exterior said tube; said flanged nipple being secured to said tube, a second tube, a nut positioned at least in part within an end of the second tube; said nut having an outward flange within and secured to the second tube; said nut extending part way into said nipple and in slide fit therewith; the flange of the nut extending into the second tube and in slide fit therewith; said tubes being immovable towards each other when the flanges are in a predetermined spaced relation and a screw in threaded engagement with said nut; said screw having a protuberance extending laterally therefrom, in contact with the end of the nipple within the first tube; the line of possible movement of the nut with respect to the nipple being parallel to the line of possible movement of the second tube with respect to the flange of the nut whereby on disengagement of the screw from the nut, the tubes are separable; the first tube being provided with a second hole through its wall; the said screw extending through such second hole and a handle means on the exterior end of said screw.

2. The joint construction as defined in claim 1, including a stressed compression coil spring carried about the screw within the first tube; one end of said spring bearing against the inner surface of the first tube and its other end bearing against the protuberance on the screw.

References Cited in the file of this patent

UNITED STATES PATENTS

| | | |
|---|---|---|
| 97,619 | Dugan | Dec. 7, 1869 |
| 949,108 | Abel | Feb. 15, 1910 |
| 958,322 | Sawitzke et al. | May 17, 1910 |
| 1,098,265 | James | May 26, 1914 |
| 1,547,285 | Armstrong | July 28, 1925 |
| 2,150,651 | Ewing | Mar. 14, 1939 |
| 2,631,062 | Tiedemann et al. | Mar. 10, 1953 |
| 2,647,000 | Colley | July 28, 1953 |